(No Model.)  F. L. DYER.  2 Sheets—Sheet 1.
COTTON PRESS.

No. 604,028.  Patented May 17, 1898.

Witnesses
J. F. Coleman
Archie G. Reese

Inventor
Frank L. Dyer (No Model.) 2 Sheets—Sheet 2.
F. L. DYER.
COTTON PRESS.
No. 604,028. Patented May 17, 1898.
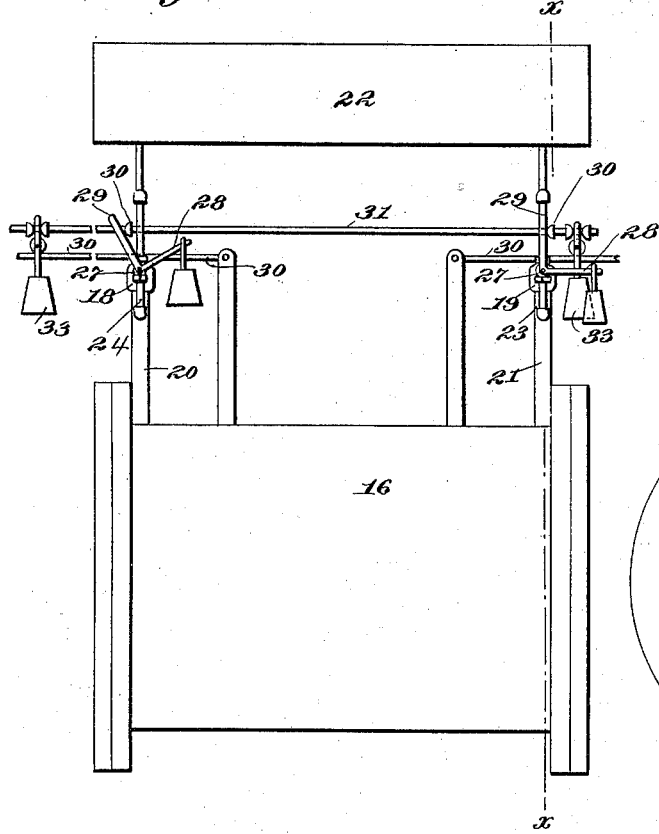
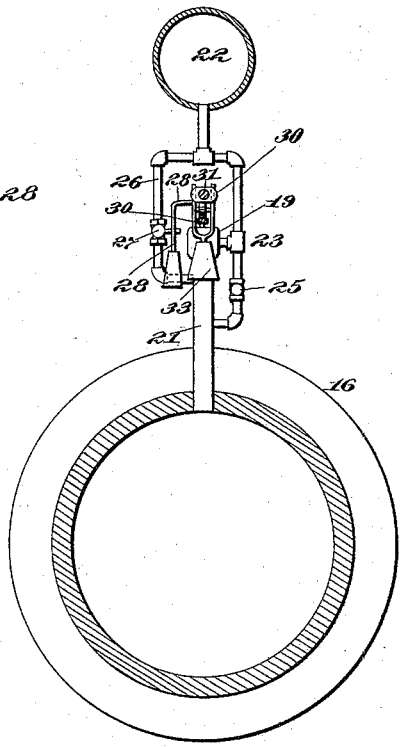
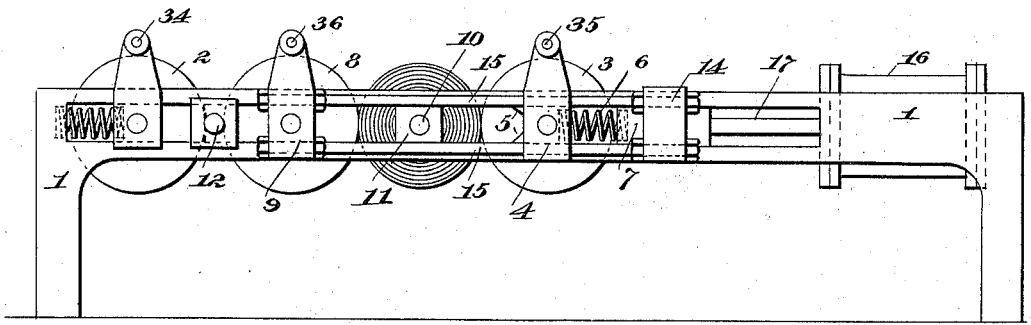
Witnesses.
J. F. Coleman
Inventor
Frank L. Dyer

UNITED STATES PATENT OFFICE.

FRANK L. DYER, OF WASHINGTON, DISTRICT OF COLUMBIA, ASSIGNOR TO THE AMERICAN COTTON COMPANY, OF NEW YORK, N. Y.

COTTON-PRESS.

SPECIFICATION forming part of Letters Patent No. 604,028, dated May 17, 1898.

Application filed December 21, 1896. Serial No. 616,481. (No model.)

*To all whom it may concern:*

Be it known that I, FRANK L. DYER, a citizen of the United States, residing at Washington, in the District of Columbia, have invented certain new and useful Improvements in Cotton-Presses, (Case No. 25;) and I do hereby declare the following to be a full, clear, and exact description of the invention, which will enable others skilled in the art to which it appertains to make and use the same.

My present invention relates to various new and useful improvements in cotton-presses of the type for making cylindrical bales, and more particularly to improvements in those presses designed for making bales from a continuously-acting gin plant and condenser.

Specific features of the invention while especially adapted for use with a duplex or tandem press, as will be described, are at the same time suited for employment with other forms of presses for producing cylindrical bales whether from a continuously or intermittently operating gin plant.

The principal object of the invention is to provide a duplex press for making bales from a continuously-fed bat and wherein substantially only a single movable roll is necessary, provision being made to retain the completed bale in the press and under pressure while the new bale is being started.

A further object and one which may be realized in many forms of presses is to combine spring-pressure on the baling roll or rolls with the usual hydraulic or other powerful compression devices, so that the bale will at first be subjected to the effect of the spring and subsequently to that of the other compression device.

A still further object is to provide special pressure-producing mechanism for effecting the desired compression on the bale, the amount of pressure gradually increasing from the commencement of the bale onward.

The particular features of novelty will be apparent from the following description and claims, attention being directed to the accompanying drawings, forming a part of this specification, and in which—

Figure 1:
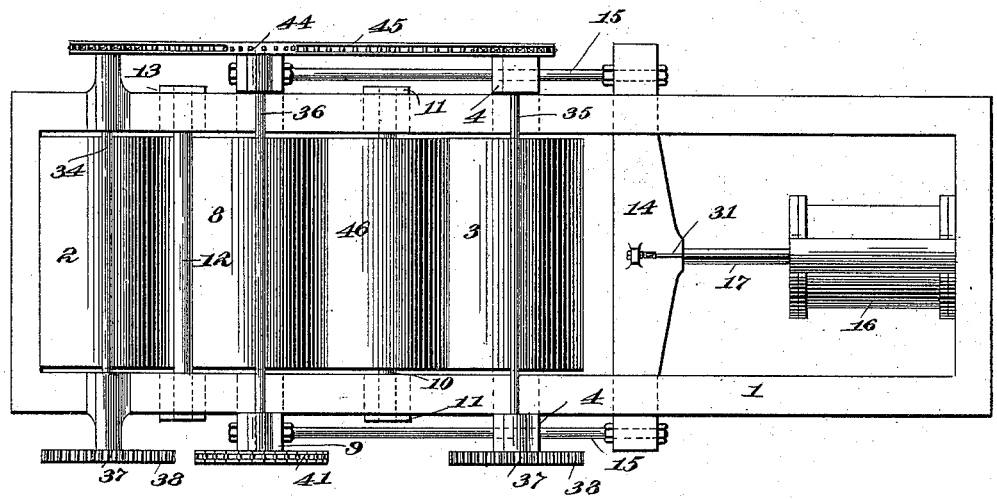
Figure 2:
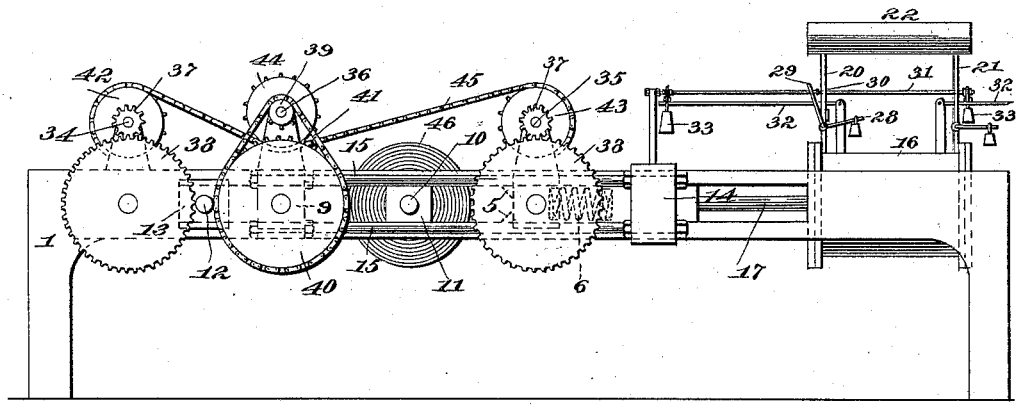

Figure 1 is a side elevation of a duplex or tandem press embodying my present improvements, the end flanges being removed and showing a finished bale ready to be covered and the parts in position for the commencement of a new bale; Fig. 2, a plan view of the same; Fig. 3, an enlarged side elevation, partly in section, of the hydraulic pressure-producing mechanism; Fig. 4, a section taken on the line $x$ $x$ of Fig. 3, and Fig. 5 a side view of an obvious modification of Figs. 1 and 2.

In all of the above views corresponding parts are represented by the same reference-numerals.

Referring first to Figs. 1 and 2, the frame 1 is of well-known construction.

2 is a baling-roll mounted in fixed bearing-boxes. 3 is a second baling-roll, mounted in sliding bearing-boxes 4. Said baling-roll 3 is normally held in engagement with stops 5 by heavy springs 6, mounted between the bearing-boxes 4 and stationary supports 7. The springs 6 are mounted in recesses in the bearing-boxes 4 and said supports 7, so that when the springs are sufficiently compressed said bearing-boxes will engage the supports, arresting the backward movement of the baling-roll and preventing further compression of the springs. 8 is a third baling-roll, mounted in sliding boxes 9, intermediate of the rolls 2 and 3. A core 10 is mounted in sliding boxes 11 between the intermediate baling-roll 8 and the baling-roll 3, and a core 12 is mounted in sliding boxes between the baling-rolls 8 and 2.

14 is a heavy cross-head movable longitudinally in the frame, and said cross-head is connected to the boxes 9 of the intermediate baling-roll at both sides of the press by two parallel rods 15, which extend through openings or channels in the boxes 4 and 11. To the cross-head 14 is connected the main pressure-producing mechanism, which in the specific embodiment of the invention illustrated is a hydraulic cylinder with connections of novel construction.

16 is the hydraulic cylinder, having a piston of the usual type, which is connected to the cross-head 14 by a heavy piston-rod 17, the latter passing through a suitable stuffing-box in the front of the cylinder. The cylinder is double acting—that is to say, it retards the movement of the piston on both strokes— so that pressure will be applied to the intermediate baling-roll 8 as it is forced either toward the roll 2 or 8.

In order to retard or oppose the movement of the piston in the cylinder, I may employ two relief-valves 18 and 19, one at each end of the cylinder and arranged in the discharge-pipes 20 and 21, respectively. Preferably these discharge-pipes connect with a small water-tank 22, mounted above the cylinder, although, if desired, the discharge-pipes may be connected together, so that the cylinder will discharge from one end into the other end. The latter arrangement is open to the objection that in case of leakage air would enter the cylinder, thereby reducing the degree of compression applied, which reduction in pressure would not be constant, but would depend on the amount of air in the cylinder. Hence the objection pointed out. By using the water-tank 22 a surplus of water is always provided, so that there can be no entrance of air into the cylinder.

In order that water may pass the relief-valves 18 and 19 to enter either end of the cylinder, I provide two run-arounds 23 and 24, each having a check-valve 25 therein opening downwardly. When the improvements are employed with a duplex or tandem press, as illustrated in Figs. 1 and 2, I make use of a second run-around 26 on the discharge-pipe 20, having a suitable cut-off valve 27, by means of which the flow through the run-around 26 may be controlled, as desired.

In the drawings I show a rotary cut-off valve normally closed by a weighted lever 28 and adapted to be opened by a lever 29, with which a stop 30 engages, said stop being carried on a rod 31, connected to or at least movable with the cross-head 14. In the specific arrangement shown these parts are so proportioned that the stop 30 will engage the lever 29 and open the cut-off valve 27 when the piston has reached a position with respect to the forward cylinder-head equal in distance to the desired amount of expansion of the springs 6; or, in other words, if it is desired to allow the springs 6 to expand six inches the cut-off valve 27 should be opened when the piston is six inches from the front cylinder-head. Instead of operating the cut-off valve 27 automatically it may be controlled by hand at the proper times.

It is considered desirable to effect a light compression on the bale at the commencement of its formation and to gradually increase the pressure in the subsequent operations. This result may be effected in any suitable way—for instance, by employing an air-chamber or air-chambers to gradually compress the air therein, or when relief-valves are used by gradually increasing the pressure thereon. The latter arrangement is shown and comprises a pivoted lever 30, bearing on the stem of each relief-valve 18 and 19 and having a weight 33 movable thereon, the weight on one lever being at its extreme end when the other weight is nearest to its respective valve. The weights may be automatically and properly shifted by being connected in any suitable way with the rod 31, before referred to.

The mechanism for driving the baling-rolls may be of any desired character, a convenient arrangement being illustrated. This comprises counter-shafts 34, 35, and 36, mounted above the baling-rolls 2, 3, and 8, respectively, the counter-shafts 35 and 36 being movable with their respective rolls. The counter-shafts 34 and 35 carry pinions 37 at one end, which mesh with gear-wheels 38, keyed to the shafts of the baling-rolls 2 and 3. The counter-shaft 36 carries at its corresponding end a sprocket-pinion 39, which drives a sprocket-wheel 40, keyed to the shaft of the baling-roll 8 by means of a sprocket-chain 41. The other ends of the counter-shafts 34, 35, and 36 carry large sprocket-wheels 42, 43, and 44, respectively, all of which are driven by a heavy sprocket-chain 45, passing over the sprocket-wheels 42 and 43 and under the sprocket-wheel 44. This sprocket-chain will in this way be maintained in driving engagement with all the sprocket-wheels, and by reason of the sprocket connection between the counter-shaft 36 and the baling-roll 8 all the baling-rolls will be driven in the same direction and at the same surface speed.

The bat or sheet of cotton is fed first to the core 10 and after the bale is formed thereon to the core 12 in any suitable way.

The operation of the specific form of press illustrated in Figs. 1 and 2 and above described will be first explained, after which the precise scope of the invention will be pointed out.

Power is applied to the press to drive all the baling-rolls in the same direction and at the same surface speed. I show a bale 46, formed on the core 10, but which has not as yet been covered. The bat or sheet of cotton coming from the condensers is therefore fed to the core 12 and will be wound thereon in the usual way. As the cotton accumulates on the core 12 the baling-roll 8 will be moved slowly backward, communicating its motion through the rods 15 to the cross-head 14 and forcing the piston in the hydraulic cylinder 16. This movement will drive the water out of the cylinder past the relief-valve 19, (the check-valve in the run-around 24 automatically closing,) and the water will be forced into the tank 22, if used. At the same time water passes from said tank (or when the same is not used from the back of the cylinder) past the check-valve in the run-around 23, which opens automatically and supplies water to the front of the cylinder. As the bale enlarges the rod 31 will move the weight 33 on the arm 32 of the relief-valve 19 and gradually increase the resistance offered by that valve to the flow of water past the same, so as to apply a gradually-increasing pressure to the bale. As soon as a bale is started on the core 12 a suitable wrapper is applied to the finished bale 46, after which that bale is removed. Hence the bale 46 will be still in the press while the bale is partially formed on the core 12, and if the baling-roll 3 were mounted in fixed boxes the press could not accommodate the finished and partially-formed bales. By mounting the baling-roll 3 in boxes which are spring-pressed the starting of the bale on the core 12 will move the baling-roll 8, the bale 46, and the baling-roll 3 slowly in the direction of the cylinder 16, thereby compressing the springs 6. I am thereby enabled to apply the covering to the bale 46 and to remove the finished bale during the time required to compress the springs 6 and at the same time subject the bale 46 to sufficient pressure to keep it revolving and to apply the covering. After the finished bale 46 is removed the springs 6 expand, forcing the baling-roll 3 to the position shown. The bale forming on the core 12 will be completed when the baling-roll 8 has been moved over in contact with the core 10, at which time the piston will have reached the end of its stroke. The bat is then shifted to the core 10 and a new bale started between the baling-rolls 3 and 8. The first effect of the enlargement of this bale will be to force the baling-roll 3 backward against the springs 6, which will be compressed, the tension of said springs being less than the resistance of the hydraulic cylinders. During this time the bale formed on the core 12 is covered and removed. When the springs 6 are compressed and the backward movement of the baling-roll 3 arrested, the baling-roll 8 will then commence to slowly move in the direction away from the cylinder 16, carrying the piston therein. This movement of the piston will force water past the relief-valve 18, the resistance of which will be gradually increased, and water will enter the back of the cylinder past the check-valve in the run-around 24. When the bale on the core 10 is finished, the baling-roll 8 will have been moved to within a short distance of the core 12—equal, in fact, to the desired amount of expansion of the springs 6, which it is to be assumed is six inches. At that time, therefore, the piston will be six inches away from the front cylinder-head. The stop 30 will then engage the lever 29, opening the cut-off valve 27 and relieving the pressure on the front of the piston. This will allow the springs 6 to expand, moving the baling-roll 3, bale 46, and baling-roll 8 in the direction away from the cylinder and bringing the baling-roll 8 into contact with the core 12, the parts occupying the positions shown in Figs. 1 and 2. As the piston moves back again the water will flow into the front of the cylinder, past the cut-off valve, which has been opened, and also past the check-valve in the run-around 23; but the cut-off valve will close as soon as the stop 30 leaves the lever 29, and water will enter the front of the cylinder through the check-valve alone.

With the specific embodiment of the invention shown in Figs. 1 and 2 the first effect of the relief-valve 19 should be almost *nil*, in order that the bale forming on the core 12 will be subjected during its early stages to the compressing effects of the springs 6 alone through the baling-roll 8 and finished bale 46, which result can be accomplished in many ways—for instance, by providing a second cut-off valve in a run-around for the relief-valve 19, which cut-off valve will be kept open during the first six inches of movement of the piston and then closed, a suitably-arranged stop on the rod 31 being used for this purpose.

Instead of employing a single set of compressing-springs for only one of the baling-rolls, as explained, the baling-roll 2 may also be spring-pressed, as shown in Fig. 5, in which case the cut-off valve or valves may be dispensed with. With this arrangement the formation of a bale on the core 11 will first tend to move the baling-roll 3 against its compression-springs, as explained, while the formation of a bale on the core 12 will first tend to move the baling-roll 2 against its compression-springs in the same way. It is believed the operation of this modified arrangement will be obvious without further description.

Having now described my invention, what I claim as new therein, and desire to secure by Letters Patent, is as follows:

1. In a cotton-press, the combination of side frames, a baling-roll mounted in sliding boxes in said side frames, means coöperating with each of the sliding boxes for said baling-roll for allowing for a slight movement thereof, a second baling-roll coöperating with the first baling-roll, a pressure-producing device for the second baling-roll, and a core mounted in sliding boxes between said rolls, substantially as set forth.

2. An improved tandem cotton-press comprising two baling-rolls, a third roll movable back and forth between the same, and means coöperating with one of the first-mentioned baling-rolls for forcing the same toward the intermediate roll, substantially as set forth.

3. An improved tandem cotton-press comprising two baling-rolls, a third roll movable back and forth between the same, means coöperating with one of the first-mentioned baling-rolls for forcing the same toward the intermediate roll, and a core between the third baling-roll and each of the two other baling-rolls, substantially as set forth.

4. In a cotton-press, the combination of side frames, a baling-roll mounted in sliding boxes in said side frames, a spring coöperating with each of the sliding boxes for said baling-roll, a second baling-roll coöperating with the first baling-roll, a pressure-producing device for the second baling-roll, and a core mounted in sliding boxes between said rolls, substantially as set forth.

5. An improved tandem cotton-press, comprising two baling-rolls, a third roll movable back and forth between the same, and springs coöperating with one of the first-mentioned baling-rolls and forcing the same toward the intermediate roll, substantially as set forth.

6. In a tandem cotton-press, the combination of two outside spring-pressed baling-rolls, and a third baling-roll, movable between the same, substantially as set forth.

7. In a tandem cotton-press, the combination of two outside spring-pressed baling-rolls, a third baling-roll movable between the same, and a pressure-producing device connected to the last-mentioned baling-roll, substantially as set forth.

8. In a tandem cotton-press, the combination of two spring-pressed baling-rolls, an intermediate baling-roll working between the same, a pressure-producing device connected to said intermediate baling-roll, and two cores between the intermediate baling-roll and the outside baling-rolls, substantially as set forth.

9. In a tandem cotton-press, the combination of two outside baling-rolls, an intermediate baling-roll working between the same, a hydraulic cylinder, connections between the cylinder and the intermediate baling-roll, a discharge-pipe extending up from each end of said cylinder, a relief-valve in each of said discharge-pipes, and a run-around for each relief-valve having check-valves therein, substantially as set forth.

10. In a tandem cotton-press, the combination of two outside baling-rolls, an intermediate baling-roll working between the same, a hydraulic cylinder, connections between the cylinder and the intermediate baling-roll, a discharge-pipe extending up from each end of said hydraulic cylinder, a relief-valve in each discharge-pipe, a lever coöperating with the stem of each relief-valve, a weight on each of said levers, and connections between both of said weights and an element movable with the intermediate baling-roll, substantially as set forth.

This specification signed and witnessed this 21st day of December, 1896.

FRANK L. DYER.

Witnesses:
ARCHIE G. REESE,
PHILIP F. LARNER.